United States Patent
Motta et al.

(10) Patent No.: US 6,325,098 B1
(45) Date of Patent: Dec. 4, 2001

(54) VALVE FOR REGULATING AND MEASURING THE FLOWRATE OF A FLUID

(75) Inventors: Renato Motta, Biassono; Mauro Saini, Milan, both of (IT)

(73) Assignee: Watts Cazzaniga S.p.A., Bolzano (IT)

( * ) Notice: Subject to any disclaimer, the term of this patent is extended or adjusted under 35 U.S.C. 154(b) by 0 days.

(21) Appl. No.: 09/634,083

(22) Filed: Aug. 8, 2000

(30) Foreign Application Priority Data

Jan. 31, 2000 (IT) .............................................. MI00A0131

(51) Int. Cl.$^7$ ....................................................... E03B 7/07
(52) U.S. Cl. ........................... 137/551; 251/266; 251/274; 73/861.74
(58) Field of Search ............................. 137/551; 251/266, 251/274; 73/861.61, 861.62, 861.71, 861.74

(56) References Cited

U.S. PATENT DOCUMENTS

| 3,187,775 | * | 6/1965 | Pinnell | ........................... 137/625.3 X |
| 5,890,515 | * | 4/1999 | Spiess et al. | ........................ 137/552 |
| 6,119,724 | * | 9/2000 | Cazzaniga | ........................... 137/552 |

FOREIGN PATENT DOCUMENTS

| 3509718 | 9/1986 | (DE) . |
| 0949486 | 10/1999 | (EP) . |
| 2731492 | 9/1996 | (FR) . |

* cited by examiner

Primary Examiner—John Rivell
(74) Attorney, Agent, or Firm—Ladas & Parry

(57) ABSTRACT

Valve for regulating and measuring the flowrate of a fluid through a header (1) and a bypass duct (2,2b) inside the said header, comprising means (10,10a) for shutting off the aperture (2b) of the bypass duct (2), which are movable axially upon operation of associated actuating means (30), means (44) for detecting the pressure exerted by the fluid flow, an instrument (43,43a) for measuring the flowrate of the fluid, the scale (43a) of which is provided on the external surface of said actuating means (30), said means (10,10a) for shutting off the aperture (2b) of the bypass duct (2) being joined to said actuating means (30) so that rotation of the latter results in only the axial movement of the former and the shut-off means (10,10a) are independent of the measuring instrument (43,43a) during their movement in the axial direction.

14 Claims, 1 Drawing Sheet

VALVE FOR REGULATING AND MEASURING THE FLOWRATE OF A FLUID

DESCRIPTION

The present invention relates to a valve for regulating and measuring the flowrate of a fluid through a header and a bypass duct inside the said header, in which the means for intercepting the fluid are independent of the measuring instrument during their movement in an axial direction towards/away from the bypass duct.

It is known in the art relating to the construction of fluid supply networks that there exists the need to provide multiple-channel header elements for conveying/returning the fluid towards/from end users; an example of these applications consists in water supply pipes for heating installations, in particular of the type comprising underground panels.

It is also known that each of the pipes sections which extend from the header must be provided with a valve for regulating the flowrate so as to be able to compensate for the various losses in head which occur in the various panels owing to their specific size and their distance from the supply header.

It is also known that there are valves which can be applied to said pipes and are able to perform regulation of the flowrate while performing simultaneously a measurement of the latter, said measurement being shown on a calibrated scale present on the valve body.

Examples of these valves are, for example, disclosed in DE 35 09 718 describing a valve which, although performing correctly its dual function (regulation/measurement), nevertheless has a limitation due to the fact that, during regulation, the pressure detection element is movable in an axial direction together with the closing body provided with the graduated scale from where the measurement is read off. This means that, in order to obtain a constant measurement upon variation in the flowrate (greater opening/closing of the obturator), the measuring duct must necessarily be constructed with a cylindrical shape.

This cylindrical shape, however, gives rise to the drawback consisting in the fact that, in these conditions, it is not possible to obtain a substantially linear measuring scale, resulting in the need for a high density of the reading scale, with obvious difficulties as regards correct reading by the user.

In addition to the above, it is known that in said installations the measuring/regulating element (flowmeter) is provided on the return section and the valve for intercepting the fluid together with an electrical and/or pneumatic control actuator is provided on the delivery section.

In this way, however, the main valve operates with the flow directed in the closing direction of the valve and, under high-pressure conditions, irreversible closing of the valve together with consequent interruption in the heating could also occur.

It is thus possible to envisage arranging the flowmeter on the delivery section and the shut-off valve on the return section, but this solution encounters difficulties owing to the fact that the flowmeters of the known type are not suitable for operation on the return section or with the fluid flow entering into the header and flowing out from the supply duct towards the plant, this giving rise to turbulence and cavitation which are the cause of noise and vibration of the measuring instrument which is no longer able to provide a precise measurement.

The technical problem which is posed, therefore, is that of providing a valve for intercepting and regulating the flowrate of fluid supply pipes, which incorporates an instrument for measuring and displaying the value of the said flowrate, is suitable for mounting on the return section of the installation and allows efficient measurement of the flowrate, solving at the same time the abovementioned problems of instruments of the known art.

Within the context of this problem a further requirement is that the valve should consist of a small number of parts and should be easy and low-cost to manufacture and assemble.

These technical problems are solved according to the present invention by a valve for regulating and measuring the flowrate of a fluid through a header and a bypass duct inside the said header, which comprises means for shutting off the aperture of the bypass duct, which are movable axially upon operation of associated actuating means, means for detecting the pressure exerted by the fluid flow, an instrument for measuring the flowrate of the fluid, the scale of which is provided on the external surface of said actuating means, said means for shutting off the aperture of the bypass duct being joined to said actuating means so that rotation of the latter results in only the axial movement of the former and the shut-off means being independent of the measuring instrument during their movement in the axial direction.

Further details may be obtained from the following description of a non-limiting example of embodiment of the invention, provided with reference to the accompanying drawings in which.

Figure 1:
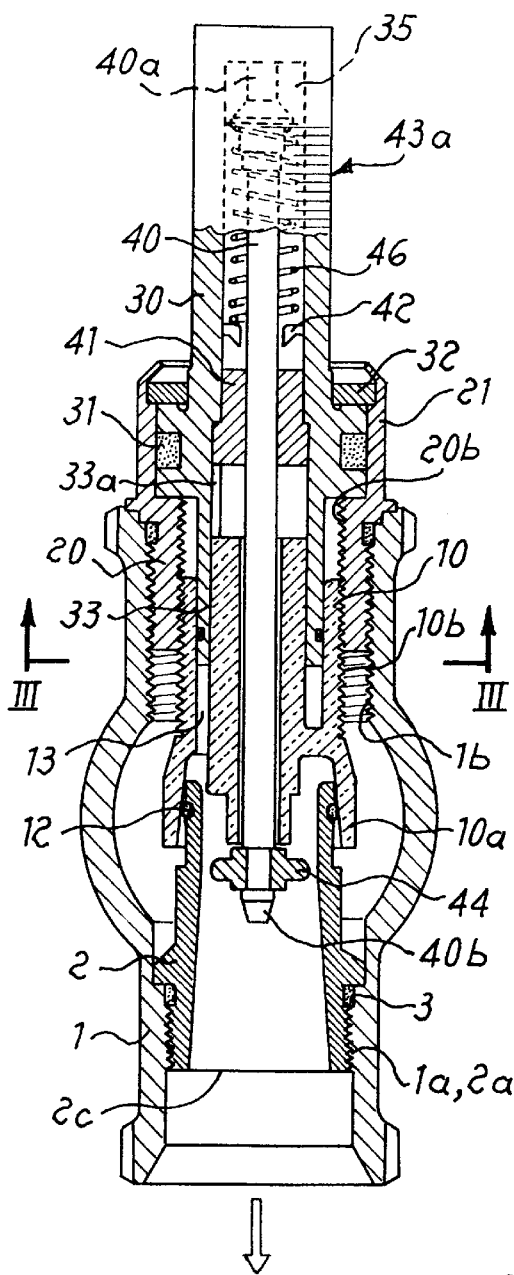
FIG. 1 shows a view, partially sectioned along a vertical plane, of an example of embodiment of the valve according to the invention in the closed condition of the valve.

As shown in FIG. 1, a header 1 is provided with at least one supply duct 2 which has a substantially frustoconical shape with a conicity from the header 1 towards the delivery section 14 of the installation and extends inside the header in a direction substantially transverse to that of the fluid flow; in the example shown in the figure the supply duct 2 is integrally joined to the header 1 by means of a screw 2a/female thread 1a connection with a sealing ring 3 arranged in between.

The free edge 2b corresponding to the smaller base of the supply duct 2 forms the inlet aperture of the valve, while the opposite aperture 2c forms the valve outlet, the fluid flow therefore occurring from the header 1 to the supply duct 2 in the direction of said delivery section 14.

The opening of the aperture 2b may be regulated by means of the end 10a of an obturator 10 which is substantially cylindrical and provided with an external threading 10b suitable for engagement with the female thread 20b of a connection piece 20 forming the element for joining the measuring instrument to the header 1, as will be explained further below.

The said end 10a of the obturator 10 has a bell shape, with the cavity 11 directed towards the supply duct 2 and, in the closed position shown in FIG. 1, is designed to interfere with a sealing element 12 of the O-ring type, so as to cause the sealing closure of the duct and hence the valve.

Figure 2:
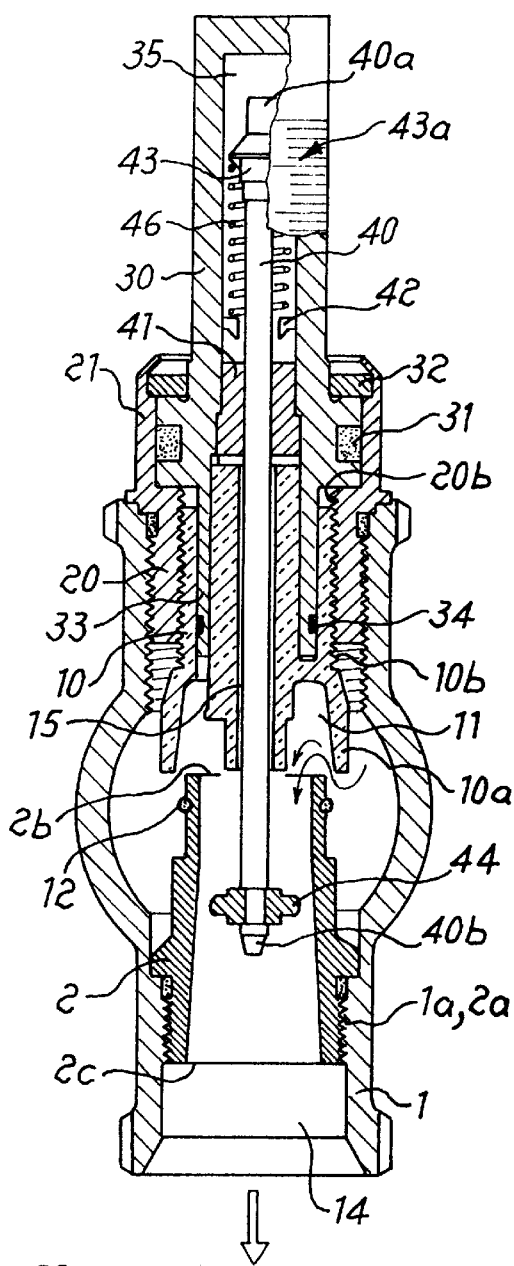
FIG. 2 shows a cross-section similar to that of FIG. 1 in the open condition of the valve.

The purpose of said bell is to prevent turbulence upon entry of the fluid into the duct 2 (FIG. 2). The obturator 10 has a coaxial through-duct 15 and an annular seat 13 extending over a suitable distance in the axial direction on the opposite side to that of the bell 11.

The connection piece 20 in turn has a thread 20a suitable for engagement with a corresponding female thread 1b of the header 1.

On the opposite side—in the axial direction—to said thread 1b, the connection piece 20 extends in the form of a cover 21 on which an internally hollow stem 30 is mounted, said stem being axially inserted into said cover 21 with the arrangement, in between, of a sealing element in the form of an O-ring 31 and being axially retained against the cover 21 by a reaction washer 32 inserted inside a suitable seat in the cover.

The end 33 of the stem 30 inside the header 1 has a shape suitable for allowing engagement, in the axial direction, with the corresponding seat 13 of the obturator 10, to which it is fastened by means of the arrangement of a sealing element 34 in between.

Figure 3:
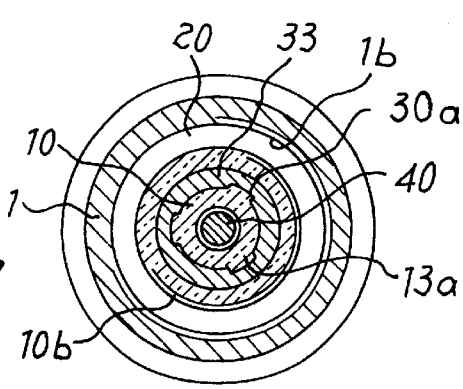
FIG. 3 shows a cross-section along the plane indicated by III—III in FIG. 1.

As shown in FIG. 3, the connection between the hollow stem 30 and the seat 13 of the bell is obtained by means of radial projections 13a of the bell 10 which are inserted into corresponding grooves 30a in the stem 30 so as to produce mutual fastening during rotation, but allow sliding in the axial direction of the obturator 10, as will emerge more clearly below.

The axial cavity 35 of the stem 30 contains a movable rod 40 guided by a bush 41 integral with the walls of the said cavity 35.

Said rod 40 extends axially through the said duct 14 of the actuator 10 as far as the inside of the supply duct 2 and is movable axially with respect to the stem 30 from an upper end-of-travel position in abutment against the external end of the stem 30 into a bottom end-of-travel position defined by an annular contact shoulder 42 integral with the said stem 30.

The rod 40 basically forms the actual measuring instrument of the valve and, for this purpose, is provided at its opposite ends 40a and 40b, on the outside and inside of the header 1, respectively, with a first annular element 43 forming the measurement indicator and a second annular element 44 forming the element which prevents the flow of fluid and against which the latter exerts the pressure which determines measurement of the flowrate.

The measurement is read off a graduated scale 43a printed on the external surface of the stem 30; so that the relative position of the indicator 43 with respect to the graduated scale 43a may be visible from the outside, the stem part outside the header is conveniently made of transparent material.

A spring 46 is arranged between said indicator element 43 and the guide bush 41, being coaxially arranged on the rod 40 and opposing the free falling movement of the rod itself, while performing at the same time calibration of the instrument.

The operating principle of the valve is as follows:

once the connection piece 20 has been screwed and locked onto the header 1 by means of the screw 20a /female thread 1b connection, the stem 30 is rotated so as to bring the bell 10a of the obturator 10 into the axial position where it closes the aperture 2b of the connecting duct 2 (FIG. 1);

in this condition the spring 46 keeps the indicator 43 aligned with the zero position on the graduated scale 43, confirming the absence of flow;

subsequent rotation of the hollow stem 30 then causes the simultaneous rotation of the obturator 10 which is rotationally constrained with the said stem by means of the projections 30a ; during its rotation the obturator 10 reacts against the connections consisting of the screw 10b/female thread 20b and screw 20a/female thread 1b which cause raising thereof in the axial direction together with consequent raising of the bell 10a (FIG. 2) and opening of the duct 2 into which fluid from header 1 starts to flow;

acting against the reaction disk 44, the fluid recalls the rod 40 against the action of the spring 46, causing a corresponding displacement of the indicator 43 along the graduated scale 43a (FIG. 2);

rotation of the stem is continued until it is possible to read the rated flowrate value and rotation is stopped.

It must be emphasized that, during regulation of the flowrate, the axial displacement of the obturator 10 does not produce a corresponding axial displacement of the measuring instrument which maintains its predefined zero position.

In addition to this, displacement of the annular element 43 towards a larger cross-section of the duct 2 following an increase in flowrate (greater opening of the valve) results in an increase in the measurement cross-section with an increase in the said flowrate; as a result it is possible to obtain a more linear measurement and therefore an indication scale which is more widely distributed over the external surface of the stem, resulting in easier and more accurate reading by the user.

Moreover, the presence of the bell allows the rod 40 of the instrument to be protected, preventing the said rod from being subject to vibrations or the like which are due to the action of the fluid and alter the measurement accuracy.

It is also envisaged that the regulating and measuring valve according to the invention may be provided with a connection duct 2 which is overturned, namely which has its larger frustoconical base arranged inside the header 1: in this configuration the valve may be arranged on the return duct of the installation and operate with a fluid flow from the return duct to the said header 1.

What is claimed is:

1. Valve for regulating and measuring the flowrate of a fluid flowing through a header and a bypass duct inside the header, comprising:

means for shutting off an aperture disposed on the bypass duct, said means being axially movable upon operation of an associated actuating means, means for detecting the pressure exerted by the fluid flow, said detecting means being integral with elements that are axially movable against the opposing action of a resilient means and said detecting means forming part of an instrument for measuring the flowrate of the fluid, a scale of which is provided on the external surface of said actuating means, said means for shutting off the aperture of the bypass duct are joined to said actuating means so that rotation of the latter results in only the axial movement of the former and the shut-off means are independent of the measuring instrument during their movement in the axial direction.

2. Valve according to claim 1, wherein said bypass duct has a frustoconical shape.

3. Valve according to claim 2, wherein the larger base of the frustoconical duct is arranged on the delivery side.

4. Valve according to claim 2, wherein the larger base of the frustoconical duct is arranged inside the header.

5. Valve according to claim 1, wherein the external surface of the bypass duct is provided with a sealing element designed to co-operate with said means for shutting off the aperture of the bypass duct.

6. Valve according to claim 1, wherein said means for shutting off the aperture of the bypass duct consist of an obturator which has its free end in the shape of a bell with its cavity directed towards the supply duct.

7. Valve according to claim 6, wherein said obturator further comprises a coaxial through-duct.

8. Valve according to claim 1, wherein said means for shutting off the aperture of the bypass duct further comprises an obturator having its free end in the shape of a bell and an annular seat extending over a suitable distance in an axial direction on the opposite side to that of the bell.

9. Valve according to claim 8, wherein said annular seat has radial projections.

10. Valve according to claim 1, wherein said means for shutting off the aperture of the bypass duct further comprises an obturator having an external thread suitable for engagement with the female thread of a connection piece forming the element for connecting the measuring instrument to the header and in turn is locked onto the said header by means of a screw/female thread connection.

11. Valve according to claim 1, wherein said means for actuating the shut-off means further comprises an internally hollow stem, the free end of said stem extending outside the valve and being provided with a graduated scale of the measuring instrument.

12. Valve according to claim 1, wherein said actuating means further comprises a stem disposed inside the header having longitudinal grooves suitable for allowing engagement with the corresponding annular projections of the seat of the obturator.

13. Valve according to claim 6 wherein said actuating means and obturator are connected to the header by means of a connection piece which can be locked to said header by means of a screw/female thread connection.

14. Valve according to claim 13, wherein said actuating means of the obturator are axially constrained with said connection piece by means of a reaction washer inserted in a special seat in the cover of said connection piece.

* * * * *